March 24, 1964 G. H. McLAUGHLIN ETAL 3,126,510
METHOD AND MEANS FOR GEOPHYSICAL PROSPECTING UTILIZING
THE EARTH'S MAGNETIC TIME TRANSIENTS
Filed May 5, 1958

INVENTORS
George H. McLaughlin
Herbert A. Harvey
William O. Cartier
William A. Robinson By Douglas S. Johnson ATTY.

United States Patent Office 3,126,510
Patented Mar. 24, 1964

3,126,510
METHOD AND MEANS FOR GEOPHYSICAL PROSPECTING UTILIZING THE EARTH'S MAGNETIC TIME TRANSIENTS
George H. McLaughlin, Herbert A. Harvey, William O. Cartier, and William A. Robinson, all of Toronto, Ontario, Canada, assignors, by mesne assignments, to Crossland Licensing Corporation Limited, Toronto, Ontario, Canada
Filed May 5, 1958, Ser. No. 733,150
17 Claims. (Cl. 324—7)

This invention relates to improvements in methods and means for geophysical prospecting, and more particularly to improved methods and means of geophysical prospecting involving the detection or measurement of the short term variations or fluctuations of the earth's magnetic field.

As has been pointed out in co-pending United States applicatoin Serial No. 440,406, now Patent No. 2,931,974, granted April 5, 1960, these short term variations or fluctuations of the earth's magnetic field, referred to as magnetic time transients or transient magnetic fields, are measurably affected by the presence of both conducting mineral deposits and by bodies having magnetic properties.

In the absence of such electrically conducting or magnetic bodies these transient magnetic fields are found to be generally horizontally polarized. Thus changes in the direction or angle of polarization of these transient magnetic fields are indicative of the presence of a disturbing conducting or magnetic body.

In co-pending United States application Serial No. 594,809, having the same assignee as the instant case, a method of measurement of the direction and/or angle of polarization of the transient magnetic fields involving measurement of the intensities of these fields is disclosed. However, because of the random or irregular nature of the transient magnetic fields, their amplitudes are continuously varying, tending to mask the intensity measurements. Moreover, in measuring intensities the sensitivities of the detecting systems or equipment must be accurately maintained despite wide temperature variations and other conditions to which the equipment is subjected to avoid any error from this source.

It is the object of this invention to provide a method and means of determining the angle from the horizontal and/or azimuthal direction of polarization of transient magnetic fields, which method and means will not be adversely affected by the intensity variations of the fields themselves or by changes in sensitivity of the detecting equipment due to temperature or other factors, thereby providing more accurate and reliable measurements than heretofore possible.

Another important object is to provide transient magnetic field detecting apparatus or equipment which will be more reliable, more compact, lighter and more readily portable than previous equipment.

According to the invention, the angle of polarization of the transient magnetic fields, that is, the angle from the horizontal, is determined by measuring the angle of the plane occupied by the turns of a detector coil placed in the field such that movement of the coil turns out of the plane in opposite directions effects a reversal of phase of signals generated in the coil. In a similar way, the direction of the field is determined, that is, the azimuthal direction.

More particularly, according to the preferred form of the invention the determination of such phase reversal is achieved by comparing the phase of signals in such detector coil with signals simultaneously generated in a second detector coil. Conveniently, though not necessarily, these detector coils are arranged in a fixed relative relation, preferably orthogonal, and the phase of signals developed in such coils by the transient magnetic fields are compared as the coils are moved to determine the plane through which one of the coils must pass to reverse signal phase therein, that is the plane in which the latter coil is oriented parallel to the transient magnetic fields. It will be understood, however, that the second or reference detector coil may be held stationary as the first coil is moved as the phases of signals generated in the coils are compared to determine the plane in which the second coil lies parallel to the transient magnetic fields.

Still another important feature resides in the provision of a phase comparator which will respond to phase variations in the detector coil signals while ignoring variations in intensity in such signals.

These and other objects and features will become apparent from the following description taken in conjunction with the accompanying drawings, in which.

Figure 1:
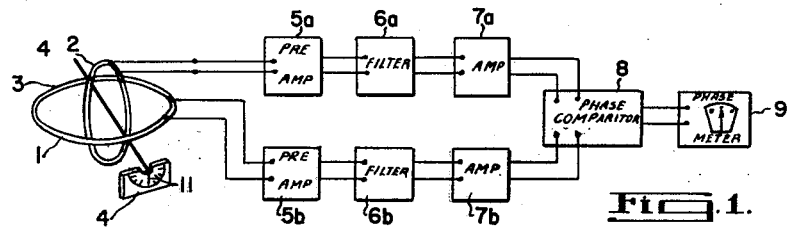
FIGURE 1 is a diagrammatic view of equipment suitable for carrying out the invention.

With reference first to FIGURE 1, the apparatus for carrying out the invention comprises a first detector coil 1 shown disposed generally horizontally, and a second substantially smaller detector coil 2 shown disposed substantially vertical. According to the preferred form of the invention the coils are shown as being rotatable or orientable about an axis 3, suitably supported as by support 4 in a horizontal position with the coils maintained in a fixed relative preferably orthogonal relation. As illustrated the axis 3, about which the coils are adapted to be rotated or oriented, is contained in the plane of the turns of both of the coils, that is, along the line of the intersection of the planes of the coil turns.

The coils 1 and 2 are connected to preamplifiers 5a, 5b which in turn are connected through filters 6a and 6b, and amplifiers 7a and 7b respectively, to a phase comparator 8 connected to an indicator 9.

Figure 2:
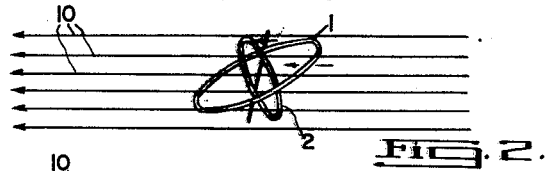
FIGURE 2 is a diagram illustrating the orientation of the detector coils in the normally horizontally polarized transient magnetic field to produce signals of the same phase in the coils.

With the detector coils 1 and 2 oriented in space as illustrated in FIGURE 2, in the presence of a transient magnetic field, illustrated by the arrows 10 as moving horizontally from right to left, the field cuts coil 1 entering the underside of the coil, and cuts coil 2, entering the right hand side of the coil. Because the transient magnetic field cuts through the turns of the coil, signals will be generated therein which will be delivered through the preamplifiers 5a and 5b and the filters 6a and 6b which select the frequency to which the system responds, and the amplifiers 7a and 7b to the phase comparator 8.

Figure 3:
FIGURE 3 is a view similar to FIGURE 2, but showing the orientation of the coils in the transient magnetic fields to produce signals of opposite phase therein.

Assuming that the signals generated in coil 1, when the transient magnetic field 10 cuts through the plane of the turns of the coil from the underside to the upper side, are of the same phase as the signals generated in coil 2 when the transient magnetic fields cut the plane of the turns of this latter coil from right to left, then a positive response in the indicator 9 will be given, with the orientation of the coils as shown in FIGURE 2. When, however, the coils are rotated or oriented to the position of FIGURE 3, it will be seen that the horizontal transient magnetic field is now cutting the plane of the turns of coil 1 from the upper side and passing through to the underside, just the reverse of the situation in FIGURE 2. However, as far as coil 2 is concerned, the transient magnetic field is still cutting through the plane of the turns of coil 2 from right to left, and therefore, the phase of the signals generated in coil 1 will now be reversed from, that is, 180° out of phase with the signal generated in coil 2, and the phase comparator will produce a negative or reverse response in the indicator 9 from that shown with the relationship of FIGURE 2.

Figure 4:
FIGURE 4 is a diagrammatic view similar to FIGURES 2 and 3 illustrating the orientation of the coils to bring one of the coils into a plane parallel to the plane of polarization of the transient magnetic fields for zero coupling therewith.

FIGURE 4 illustrates the relationship or orientation of the coils in space to bring the plane of the turns of coil 1 into parallelism with the horizontally polarized transient magnetic field 10 so that no signal is generated in coil 1, with the result that the output of the phase comparator will be zero. Thus, through the use of the two coils, the detector may be easily oriented to bring one of the coils, e.g. coil 1 into a position where the plane of its turns are parallel to the transient magnetic field at any selected point in space, since movement of such coil 1 in opposite directions out of such plane will bring a reversal of phase of the signal generated therein as compared to the signal generated in coil 2.

Because the system operates in response to phase differences in the coils 1 and 2, differences in amplitude of the signals generated in these coils can be ignored, and there is no requirement to maintain equal sensitivity in the two channels of the system comprised by the components 5a, 6a, and 7a on the one hand, and 5b, 6b, and 7b on the other hand. Further, the system is independent of amplitude variations in the transient magnetic fields themselves, since again, such variations are ignored when the factor of phase is the only factor compared.

From the above, it will be appreciated that the system described will enable coil 1 to be quickly oriented in space to bring the plane of its turns into parallelism with the transient magnetic field as represented by the arrows 10. As this field is normally horizontally polarized, but it caused to deviate from such horizontal polarization in the vicinity of an influencing conductive or magnetic geophysical body, then upon it being found that the plane of the turns of coil 1 is disposed out of the horizontal when parallel with the transient magnetic fields at the particular point in space, then the person using the equipment will be informed of the presence of such influencing geophysical body. A suitable clinometer 11 is provided to enable the deviation of coil 1 from the horizontal to be determined, and it will be understood that a series of such determinations in an area will enable the position of the influencing geophysical body to be indicated.

It may also be desirable to measure the azimuthal direction of the transient magnetic field and to effect such measurement, the coil unit as comprised by the coils 1 and 2 may be employed with the axis of rotation 3 vertical, and the coil unit rotated in a horizontal plane to a position where the signals generated in one of the coils are neither in phase nor out of phase with the signals generated in the other coil, at which time the operator will know that the plane of the turns of the first coil is parallel to the direction of the transient magnetic field at that particular point in space. The direction or declination of the transient magnetic field at such point may readily be obtained from a compass reading.

It will be noted that coil 2 is normally oriented in a generally vertical position, so that the plane of its turns is usually nearly perpendicular to the transient magnetic field indicated by the arrows 10 with the result that a relatively small coil may be employed as coil 2, and adequate signals will be generated therein by the transient magnetic fields. Coil 1, on the other hand, generally is located with the plane of its turns close to parallelism with the transient magnetic field with the result that the linkage of such field with the turns of this coil are substantially less than the linkage of the field with the turns of coil 2, and coil 1 preferably is substantially larger than coil 2.

While the attachment of coil 2 to coil 1 forms a detector unit which can be conveniently handled, it will be obvious that coil 1 may, if desired, be separated from and moved independently of coil 2 and the phase of the signals generated in the two coils compared to determine the plane into which coil 1 must be oriented to lie parallel to the transient magnetic fields. For instance, coil 2 may be maintained stationary in a generally vertical position and when the phase of signals generated in coil 1 are compared with the signals generated in coil 2 by the transient magnetic fields the indicator 9 will reverse as coil 1 is oriented to move the plane of its turns in opposite directions out of parallelism with the transient magnetic fields.

In previous systems which we have proposed, using amplitude or intensity measurements with a pair of coils, it was found necessary to provide coils of equal size corresponding to coil 1 in size. The present invention, therefore, provides a reduction in size and weight of coil units capable of indicating influencing geophysical bodies through the measurement of transient magnetic fields.

In addition, of course, with the elimination of all effects of amplitude or intensity variations in the transient magnetic fields themselves, and the elimination of effects of sensitivity changes in the amplifier systems employed with the coil unit, the major sources of error experienced in the measurement of the transient magnetic fields have been overcome, with the result that the equipment is extremely reliable in operation, and provides a high degree of accuracy in ascertaining the angle and direction of polarization of the transient magnetic fields at any point in space.

Figure 5:
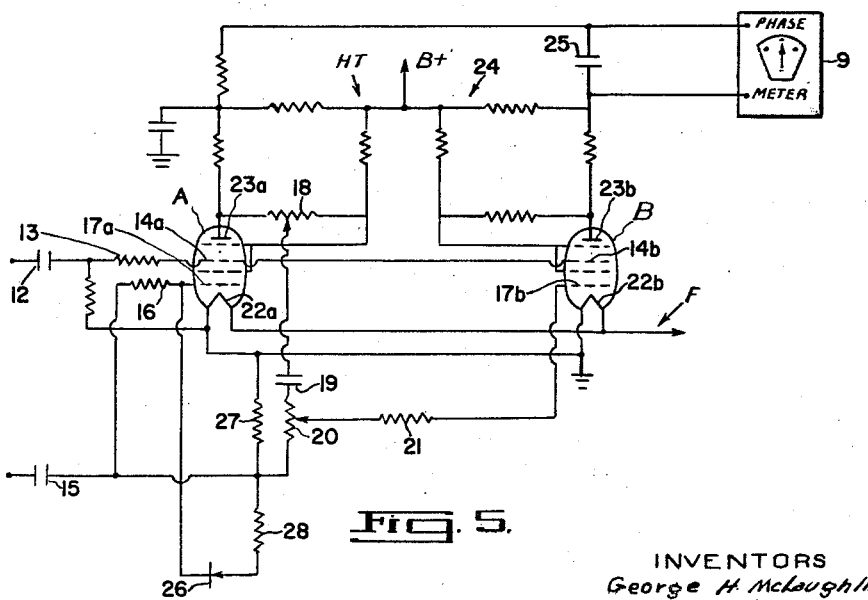
FIGURE 5 is a schematic wiring diagram of a suitable phase comparator according to the invention.

A suitable phase comparator for ascertaining the reversal of phase of signals generated in coils 1 and 2 is shown in FIGURE 5 in schematic form. As illustrated, a signal from coil 2 is delivered through a suitable coupling condenser 12, and current limiting resistor 13 to grids 14a and 14b of suitable multielectrode amplifying tubes A and B. Meanwhile, a signal from coil 1 is delivered through a suitable coupling condenser 15 and resistor 16 to the control grid 17a of tube A, while the output of tube A, as appearing across resistor 18, is fed to the control grid 17b of tube B through coupling condenser 19 and resistors 20 and 21. The cathodes 22a and 22b are suitably heated through filament circuit F, and the plates 23a and 23b are connected to H.T. through a suitable condenser resistor network indicated at 24.

The output of tube A is applied to one terminal of the indicator 9 at one side of condenser 25, while the output from tube B is applied to the other terminal of the indicator 9 which is a suitable voltage responsive device at the opposite side of condenser 25. Tube A may have a suitable negative bias applied thereto through the employment of rectifier 26 and resistors 27 and 28.

It will be understood that when the signal fed from coil 2 to the tubes A and B is in phase with the signal fed from coil 1 to the control grid of tube A, there will be an amplification of such signal from coil 1 to provide an output signal at the plate of tube A. This output signal will be out of phase with the signal received from coil 1, and of course, with the signal received from coil 2 so that the voltage applied to the control grid of tube B will be out of phase with the voltage applied to grid 14b from coil 2. The result, therefore, will be that the output from tube A will be greater than from tube B, and the voltage responsive indicator 9, which may be a suitable meter, may be arranged under these circumstances to indicate a positive reading, or if desired, a negative reading.

If, however, the signals from coil 1 are 180 degrees out of phase with the signals from coil 2, then when grid 14a of tube A goes positive, control grid 17a will go negative, reducing current flow in tube A and increasing plate voltage. Thus, the output of tube A will be positive at the time that this signal from coil 2 is positive, and this positive voltage applied to the control grid 17b of tube B at the time the signal from coil 2 is positive, will increase current flow in tube B, and the output from tube B will be relatively larger than the output from tube A, and the indicator 9 will reverse the phase indication previously given.

When coil 1 is oriented so that the plane of its turns lie parallel to the transient magnetic field, which may be considered the situation when the signal from the coils are 90 degrees out of phase, then there will be no effect from coil 1 in the comparator circuit, and the relative output of tubes A and B will be the same, giving zero reading.

It will be understood that the system may be arranged to detect transient magnetic fields of any desired frequency, and if desired, transient magnetic fields of several frequencies may be detected in order to ascertain information about the conductivity or magnetic properties of the influencing geophysical body. Generally speaking, the operable range of frequencies with which the present invention is concerned comprises transient magnetic fields having a frequency approximately within the range of from 1 to 20,000 cycles per second. It will be understood that the filters 6a or 6b may be selected or may be adjusted to select the desired frequencies with which the system is to be used when looking for a particular type of geophysical structure in a particular area, as will be understood by those skilled in the art, and it will be appreciated that various tuning arrangements may be resorted to as desired.

It will be also appreciated that various circuitry may be employed in the application of the concept of comparative phase measurements according to the invention, and other changes and modifications in the equipment and in the manner of carrying out geophysical prospecting embodying the concepts of the invention may be made without departing from the spirit of the invention or scope of the appended claims.

What we claim as our invention is:

1. A method of geophysical prospecting comprising utilizing as an exploring energy source time transients of the earth's magnetic field, and orienting a detector coil responsive to said magnetic time transients in space through the detection of any reversals in phase of signals generated in said coil under spacial coil movement to locate the turns of the coil in a plane movement out of which in opposite directions effects a reversal of phase of said signals generated in said coil by said magnetic time transients, and noting the spacial disposition of said plane as an indication of the presence of an influencing geophysical body.

2. A method as claimed in claim 1 in which said detector coil is arranged to respond to magnetic time transients of at least one frequency within the frequency range of from 1 to 20,000 c.p.s.

3. A method as claimed in claim 2 in which the turns of said detector coil are brought into said plane by movement about a substantially horizontal axis contained in the plane of the turns and any deviation of said plane from the horizontal is determined as an indication of the angle of polarization of such magnetic time transients due to the presence of a geophysical body.

4. A method as claimed in claim 2 in which the turns of said detector coil are brought into said plane by movement about a substantially vertical axis contained in the plane of the turns, the declination of said plane indicating the direction of polarization of such magnetic time transients.

5. A method of geophysical prospecting comprising detecting magnetic time transients in space by means of two detector coils responsive to said transients, comparing the phase of signals generated in said coils by said magnetic time transients for determining relative phase reversals of said signals while orienting one of said coils in space until the turns thereof occupy a plane movement in opposite directions out of which reverses the phase of signals generated therein as compared with the phase of signals generated in the other coil, and noting the spacial disposition of said plane as an indication of the presence of an influencing geophysical body.

6. A method as claimed in claim 5 in which said detector coils are maintained in a fixed relative orthogonal relation, and both said coils are simultaneously moved in the orientation step.

7. A method of geophysical prospecting comprising detecting magnetic time transients in space by means of two detector coils, comparing the phase of signals generated in said coils by said magnetic time transients in a manner to determine relative phase reversals of said signals while orienting one of said coils about a substantially horizontal axis contained in the plane of the turns of said latter coil until said latter coil turns occupy a plane movement about said axis in opposite directions out of which reverses the phase of signals generated therein as compared with the phase of signals generated in the other coil, and noting any deviation of said plane from the horizontal as an indication of the presence of an influencing geophysical body.

8. A method of geophysical prospecting comprising detecting in space naturally occurring magnetic time transients of at least one frequency within the range of 1 to 20,000 c.p.s. by means of two detector coils tuned to respond to at least one frequency within said frequency range, comparing the phase of signals generated in said coils by said magnetic time transients in a manner to determine relative phase reversals of said signals while orienting one of said coils about a substantially horizontal axis contained in the plane of the turns of said latter coil until said latter coil turns occupy a plane movement about said axis in opposite directions out of which reverses the phase of signals generated therein as compared with the phase of signals generated in the turns of the other coil, and noting any deviation of said plane from the horizontal as an indication of the presence of an influencing geophysical body.

9. A method as claimed in claim 8 in which said coils are maintained in a fixed relative orthogonal relation as said one coil is revolved about said substantially horizontal axis.

10. A method of geophysical prospecting as claimed in claim 8 in which said signals generated in said coils are compared by delivering the signal of one of said coils to grids of a pair of electron amplifying tubes disposed intermediately of the plates and control grids of said tubes, and by delivering the signal of the other of said coils to the control grid of one of said tubes, and delivering output signals from said latter tube to the control grid of the other tube, and applying the output of said tubes across a voltage responsive indicator.

11. A method as claimed in claim 8 in which said detector coils are additionally oriented about a substantially vertical axis contained in the plane of the turns of one of said coils while maintaining said coils in fixed relative relation until said latter coil turns occupy a plane movement about said vertical axis out of which reverses the phase of signals generated therein as compared with the phase of signals generated in the other coil, and noting declination of said latter plane as an indication of the direction of polarization of said transient magnetic fields at the point of said vertical axis as a means of indicating an influencing geophysical body.

12. Means for locating conductive and magnetic geophysical bodies comprising a first detector coil and a second detector coil, said coils having a sensitivity and being tuned to respond to at least one frequency of the naturally occurring transient magnetic fields within the range of approximately 1 to 20,000 c.p.s., and phase comparator means for determining when the phase of signals generated in one of said coils reverses with respect to the phase of signals generated in the other of said coils.

13. Means for locating conductive and magnetic geophysical bodies comprising a first detector coil and a second detector coil, at least one of said coils being orientable in space and both said coils being responsive to naturally occurring magnetic time transients of at least one frequency within the frequency range of approximately 1 to 20,000 c.p.s., and means for comparing the phase of signals generated in said detector coils to indicate when the phase of a signal generated in one of said coils has reversed with respect to the phase of signals generated in the other of said coils as said orientable coil is oriented in space.

14. Means as claimed in claim 13 in which said coils are maintained in a fixed relative orthogonal relation.

15. Means as claimed in claim 14 in which both said coils are rotatable about an axis contained in the plane of the turns of one of said coils.

16. Means as claimed in claim 15 in which said axis is contained in the plane of both of said coils.

17. Means as claimed in claim 15 in which means are provided for ascertaining the position of the plane of said turns, movement of said turns out of which in opposite directions produces a reversal of phase of signal generated in said turns as compared to the signal generated in the other coil.

References Cited in the file of this patent

UNITED STATES PATENTS

| | | |
|---|---|---|
| 1,794,666 | Bieler et al. | Mar. 3, 1931 |
| 2,517,805 | Spindler | Aug. 8, 1950 |
| 2,555,209 | Vacquier | May 29, 1951 |
| 2,559,586 | Bjarnason | July 10, 1951 |
| 2,623,097 | Kunetz | Dec. 23, 1952 |
| 2,664,542 | Lynn | Dec. 29, 1953 |
| 2,677,801 | Cagniard | May 4, 1954 |